United States Patent [19]
Binns

[11] 3,915,055
[45] Oct. 28, 1975

[54] BLIND RIVET HAVING COUNTERBORED SLEEVE HEAD OF DOUBLE-ANGLE CONFIGURATION

[76] Inventor: Lloyd Sylvester Binns, 11781 West St., Garden Grove, Calif. 92640

[22] Filed: July 25, 1974

[21] Appl. No.: 491,787

Related U.S. Application Data

[62] Division of Ser. No. 302,266, Oct. 30, 1972, Pat. No. 3,850,021.

[52] U.S. Cl. ........................................ 85/77; 85/78
[51] Int. Cl.² ...................................... F16B 13/06
[58] Field of Search .................. 85/72, 77, 78, 70

[56] References Cited
UNITED STATES PATENTS

| | | | |
|---|---|---|---|
| 3,377,908 | 4/1968 | Stau et al. | 85/78 |
| 3,390,601 | 7/1968 | Summerlin | 85/78 |
| 3,489,056 | 1/1970 | Blakeley | 85/78 |

*Primary Examiner*—Edward C. Allen
*Attorney, Agent, or Firm*—Howard A. Silber

[57] ABSTRACT

In a blind rivet of the type having a mandrel, a sleeve and a locking collar, and adapted for installation by a non-shifting pulling head, the improvement wherein the head of the sleeve is counterbored to form adjacent conical surfaces of different angles. The outer conical surface defines a relatively shallow locking collar entry resistance angle, and the inner conical surface defines a relatively steeper angle for guiding the insertion of the locking collar into the locking groove of the mandrel.

4 Claims, 7 Drawing Figures

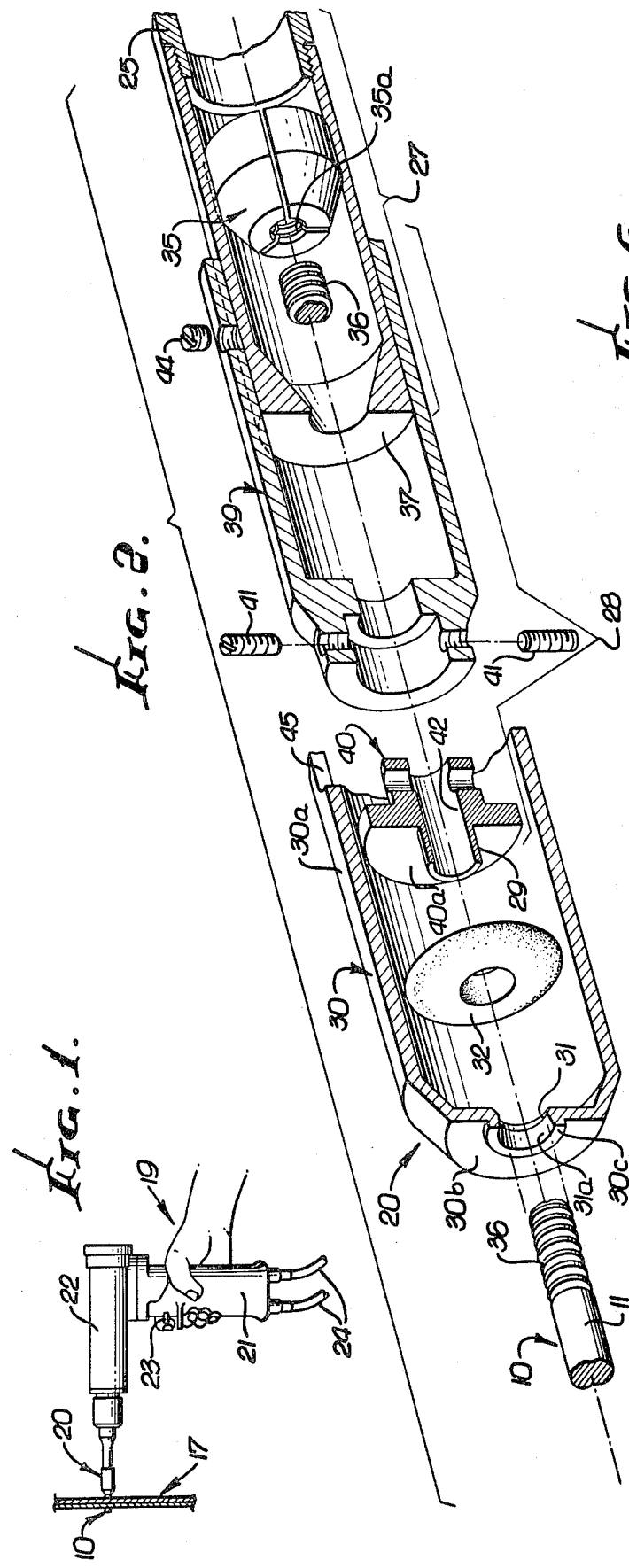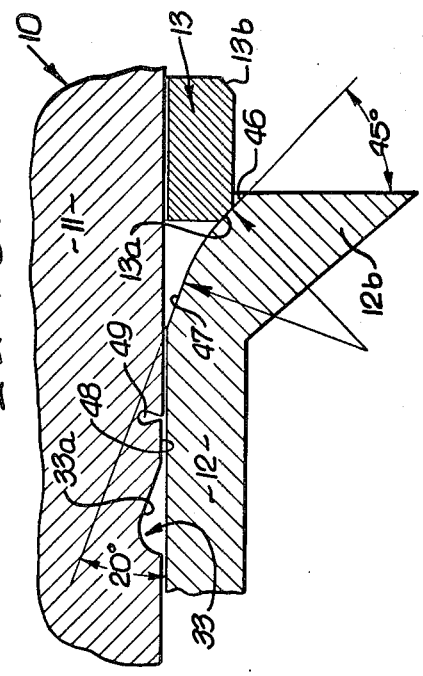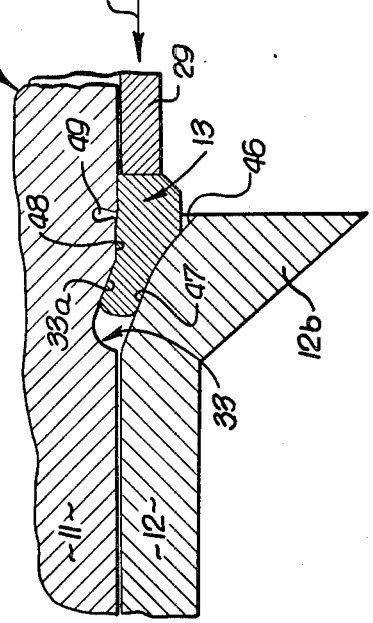

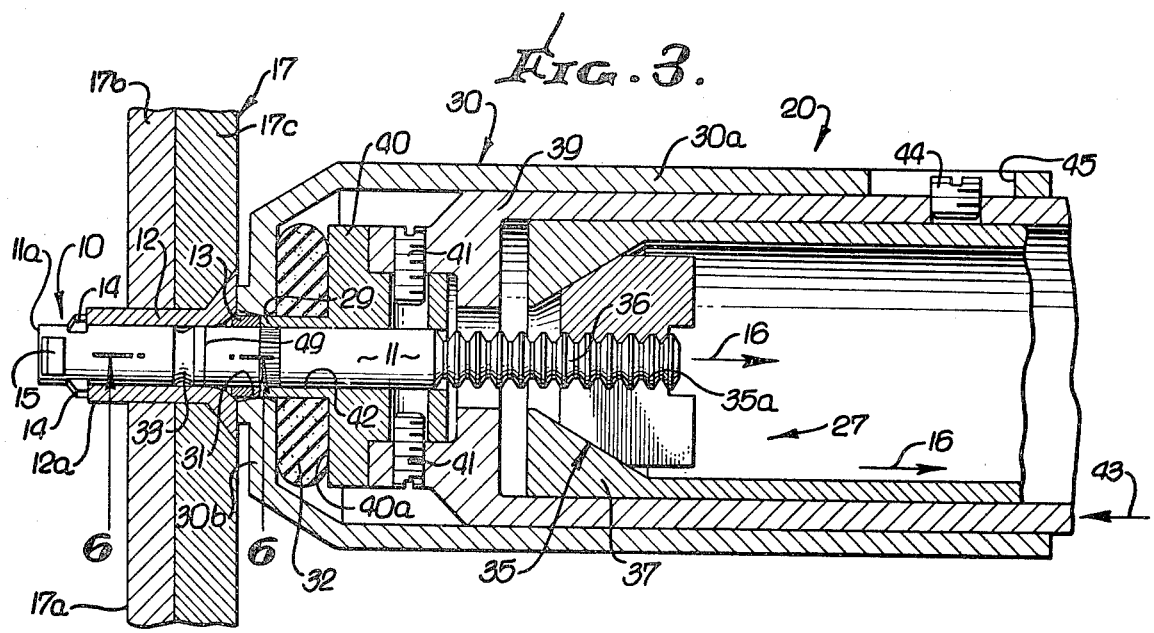

BLIND RIVET HAVING COUNTERBORED SLEEVE HEAD OF DOUBLE-ANGLE CONFIGURATION

This is a division of application Ser. No. 302,266 filed Oct. 30, 1972, now U.S. Pat. No. 3,850,021.

BACKGROUND OF THE INVENTION

1. Field of the Invention

The present invention relates to rivet installation tools, and more particularly to a non-shifting pulling head for installing blind rivets.

2. Description of the Prior Art

Blind rivets are widely used to fasten components when only one side of the workpiece is accessible. Such rivets comprise three pieces: (a) a stem or mandrel having a bulb-forming tail at one end and serrations at the other end for engagement by a pulling tool, (b) a rivet sleeve surrounding the mandrel and having a flanged head, and (c) a locking collar encircling the mandrel near the sleeve head. In use, the tail portion of the mandrel and the surrounding sleeve together are inserted through a hole in the workpiece. A riveting tool including a pulling head is used to translate the mandrel axially away from the workpiece. During such translation, the bulb-forming elements of the mandrel head expand the rivet sleeve laterally to form a "blind bulb" on the hidden side of the workpiece. The pulling head then forces the locking collar into a groove in the mandrel to lock the headed, accessible end of the sleeve to the stem. Finally, the stem portion extending from the workpiece is broken off to complete the installation.

Known blind rivet installation tools typically include a fluid actuated reciprocating mechanism having a drawbolt to which the pulling head is attached. The pulling head includes chuck jaws having internal teeth which engage the pulling serrations on the rivet stem. A collet surrounds the jaws and is threaded to the drawbolt. As the drawbolt is translated rearwardly by the reciprocating mechanism, the collet and jaws cooperate to pull the rivet stem away from the workpiece.

As the mandrel is pulled, the reaction force first is exerted on the rivet sleeve head, and subsequently is shifted to the locking collar. Thus during blind bulb formation the reaction force is exerted by a first pressure device comprising the outer housing of the pulling head and an annular anvil which presses against the flanged head of the rivet sleeve. At a predetermined point of the pulling stroke, the reaction force is shifted to a secondary pressure device which forces the locking collar into the locking groove of the mandrel. This secondary pressure device is situated between the collet and the outer housing, and terminates at a second annular anvil which seats against the locking collar. A complex mechanism, not unlike a lost motion linkage, transfers the reaction force from the first to the secondary pressure device when the drawbolt has been retracted a certain distance.

The foregoing type of installation tool, commonly known as a "shifting" pulling head, is exemplified by the U.S. Pat. No. 3,038,626 to Simmons entitled Mechanism for Setting Rivets.

The need for shifting pulling heads arose as a consequence of the design of prior art blind rivets. In such rivets, the sleeve-expanding element on the mandrel head generally was annular. Thus as the mandrel was translated, the bulb-forming annulus exerted a uniform radial force around the entire sleeve end. Considerable pulling force was necessary to exceed the column strength of the rivet, and thereby insure consistent blind-bulb formation. The concomitantly large reaction force had to be applied directly to the relatively large surface area of the sleeve head. Application of the reaction force via the locking collar resulted in unsatisfactory conditions such as wall thickening ("squashing") of the collar, excessive flaring or expansion of the sleeve head, or premature gripping of the mandrel by the collar. As a result, the double anvil, force shifting arrangement was adopted, first to apply the reaction force to the sleeve head during blind-bulb formation, and later to apply the force to the locking collar to swage it into the mandrel locking groove.

A significantly improved blind rivet is disclosed in the inventor's co-pending application, Ser. No. 392,262. In that rivet, the blind bulb is formed by sets of sleeve-expanding flanges which extend laterally from the mandrel head, each flange having a radial extent considerably less than 360°. In a preferred embodiment, shown hereinbelow in FIGS. 3, 4 and 5, the rivet 10 includes a mandrel 11, a sleeve 12 and a locking collar 13. The mandrel 11 is provided with a lower pair of sleeve-expanding shear flanges 14 and an upper pair of non-shearing, sleeve-expanding flanges 15. The flanges 14 are diametrically opposed, and are radially offset by 90° from the flanges 15 which also are diametrically opposed. Thus the flanges 14, 15 together present a cruciform shape when viewed from the mandrel blind end 11a.

As the mandrel 11 is pulled in the direction of the arrow 16, the lower flanges 14 cause lateral expansion of the rivet sleeve end 12a. This expansion is not radially uniform; maximum expansion of the sleeve 12 occurs in the sectors corresponding in radial orientation to the flanges 14. Further pulling causes the flanges 14 to force the expanded sleeve 12a against the inaccessible surface 17a of the workpiece 17, forming a blind-bulb 18 (FIG. 5). For a thicker workpiece, further pulling causes the lower flanges 14 to shear from the mandrel 11 and translate axially toward the blind end 11a. The upper flanges 15 then expand the sleeve end 12a along sectors different from those expanded by the flanges 14 to form a blind bulb which positively clinches together the workpiece components 17b and 17c.

A characteristic of the improved rivet 10 is that the tensile strength of the sleeve 11 may be much closer to that of the mandrel than possible with prior art blind rivets. Moreover, since the flanges 14, 15 expand the sleeve end 12 in a radially non-uniform pattern, less pulling force is required for blind bulb formation. As a result, the rivet 10 readily can be installed with a non-shifting pulling head of significantly simpler construction and operation than the shifting pulling heads known in the prior art. Such a non-shifting pulling head is disclosed and claimed in the inventor's parent co-pending patent application, Ser. No. 302,266. The principal ofject of the present invention is to provide a blind rivet uniquely configured for optimum inserting with such a non-shifting pulling head.

SUMMARY OF THE INVENTION

This and other objectives are achieved by providing a blind rivet wherein the locking-collar-receiving counterbore in the rivet sleeve head is of double-angle configuration. During the blind-bulb forming portion of the pulling stroke, a chamfered edge of the locking collar presses against the counterbore surface having an entry resistance angle of about 45°. Effective reaction force transmission to the sleeve is achieved. Subsequently, locking collar insertion is assisted by the adjacent counterbore surface which iss tapered generally parallel to the mandrel locking groove.

BRIEF DESCRIPTION OF THE DRAWINGS

A detailed description of the invention will be made with reference to the accompanying drawings, wherein like numerals designate corresponding parts in the several figures.

FIG. 1 is a pictorial view of a blind rivet installation tool incorporating the inventive non-shifting pulling head.

FIG. 2 is an exploded, pictorial view of the pulling head in accordance with the present invention.

FIGS. 3, 4 and 5 are transverse sectional views of the pulling head during successive portions of a blind rivet installation cycle.

FIG. 6 is an enlarged, fragmentary, transverse sectional view of a blind rivet advantageously installed by the tool of FIG. 1, and showing certain details of the mandrel, rivet sleeve and locking collar. The rivet is as seen along the line 6—6 of FIG. 3.

FIG. 7, an enlarged sectional view as seen along the line 7—7 of FIG. 5, shows insertion of the locking collar into the mandrel locking groove.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

Referring now to FIGS. 1 and 2, the blind rivet 10 advantageously is installed in the workpiece 17 using riveter 19 incorporating the inventive non-shifting pulling head 20. The riveter 19 is of conventional design and includes a pistol-grip handle 21 supporting a hydraulically actuated reciprocating mechanism 22. When a trigger switch 23 is depressed, hydraulic fluid transmitted via cables 24 from a power unit (not shown) causes the reciprocating mechanism 22 to pull a drawbolt 25 (FIG. 2) rearwardly, away from the workpiece 17. As described below in connection with FIGS. 3–5, the rearward stroke of the mechanism 22 actuates the pulling head 20 to accomplish installation of the rivet 10.

The pulling head 20 (FIG. 2) includes four major components; (a) a collet and jaws assembly 27 used to pull the rivet mandrel 11, (b) a non-shifting anvil assembly 28 which exerts the reaction force on the locking collar 13 continuously throughout the installation cycle via a cylindrical anvil 29, (c) a shroud 30, having an opening 31 which prevents upset or wall thickening of the locking collar under load, and (d) a resilient spacer 32 which separates the anvil assembly 28 and the shroud 30 during blind-bulb formation, and thereafter collapses to permit the anvil 29 to swage the locking collar 13 into the mandrel locking groove 33 (FIGS. 6 and 7).

The assembly 27 includes split or chuck jaws 35 which engage the serrations 36 of the mandrel 11. A collet 37 surrounds the jaws 35 and is threaded to the drawbolt 25. Thus during rearward reciprocation of the drawbolt 25, the collet 37 will urge the jaw teeth 35a into engagement with the serrations 36, and thereafter will pull the mandrel 11 in the direction of the arrows 16 (FIG. 3). A conventional jaw follower assembly (not shown) urges spreading of the chuck jaws 35 to release the severed mandrel section after completion of the installation cycle. Configuration and operation of the collet and jaws assembly 27 is conventional.

The non-shifting anvil assembly 28 includes a generally tubular body 39 and an anvil barrel 40 attached thereto by set screws 41. The barrel 40 has a coaxial bore 42 which receives the mandrel 11. The cylindrical anvil 29 projects forwardly of the barrel 40 and functions to apply the reaction force (indicated by the arrows 43) to the locking collar 13. This reaction force maintains the sleeve 12 in place as the mandrel 11 is translated to the right (as viewed in FIGS. 3–5) to form the blind bulb 18. As mandrel translation terminates, the reaction force exerted via the anvil 29 pushes the locking collar 13 into the locking groove 33 (FIG. 5).

The locking collar shroud 30 surrounds the forward portion of the anvil assembly 28 and includes a cylindrical section 30a which slidingly engages the body 39. Relative axial motion is limited by a set screw 44 extending from the body 39 into a slot 45 in the shroud 30. The forward, closed end 30b of the shroud 30 includes the central opening 31 which has an inner diameter approximately equal to the outer diameter of the locking collar 13. An annular boss 30c integral with the shroud 30 ensures that the length of the opening 31 is slightly greater than the length of the locking collar 13. The forward inner surface 31a of the opening 31 is tapered outwardly at a slight angle, typically 2° with respect to the shroud axis, to help ease the locking collar 13 free of the shroud 30 for insertion into the locking groove 33.

As seen in FIGS. 3 and 4, the forward end of the anvil 29 also seats within the shroud opening 31 in contact with the locking collar 13. The spacer 32, typically an annulus of foam rubber or like resilient material, surrounds the cylindrical anvil 29 and maintains appropriate spacing between the shoulder 40a of the anvil barrel 40 and the shroud end 30b. As a result, the anvil 29 remains sufficiently far retracted so as to permit insertion of the locking collar 13 into the opening 31 at the beginning of the installation cycle. Note that the shroud 30 is not a force-transmitting member, and functions primarily to limit deformation of the locking collar 13 during the blind-bulb forming portion of the installation cycle.

At the beginning of the pulling cycle (FIG. 3) the collet 37 and jaws 35 pull the mandrel 11 away from the workpiece 17. The reaction force (arrow 43) is exerted via the body 39, the barrel 40, anvil 29 and the locking collar 13 to prevent axial translation of the rivet sleeve 12. As indicated in FIG. 4, this causes the flanges 14 to expand the rear end 12a of the sleeve 12 to begin blind-bulb formation.

To optimize such reaction force transmission, the locking collar 13 and the head 12b of the sleeve 12 preferably are configured as shown in FIG. 6. Both outer annular edges 13a, 13b of the collar 13 are chamfered, typically at about 45°. The sleeve head 12b is counterbored to form two adjacent conical surfaces 46 and 47. During the portion of the pulling stroke, one collar edge 13a seats against the outer counterbore surface 46 which is formed at a relatively shallow angle, typically 45° with respect to the sleeve axis. As a result, much of the axial force exerted by the anvil 29 is transmitted via the locking collar 13 to the sleeve 12. The radially inward, lateral force component introduced at the collar-counterbore surface 47 interface is counteracted by the hoop strength of the collar 13. The collar 13 has little tendency to bind against the mandrel 11. Outward deformation of the collar 13 is resisted by the same collar-counterbore interface, as well as by the shroud opening 31.

The inner counterbore surface 47 is relatively more steep than the adjacent surface 46, and preferably is approximately parallel with the inwardly tapered surface 33a of the mandrel locking groove 33. An angle of about 20° with respect to the sleeve 12 axis is typical for the surface 47 (FIG. 6). This configuration aids the swaging insertion of the collar 13 into the locking groove, as illustrated in FIGS. 5 and 7. Such insertion also is aided by making the mandrel diameter in the region 48 between the locking groove 33 and the break notch 49 slightly less (typically 0.002 inches) than the diameter of the remainder of the mandrel 11.

Of course, the locking collar 13 is forced into the groove 33 near the end of the pulling stroke, when axial translation of the mandrel 11 has terminated subsequent to formation of the blind bulb 18. When such mandrel translation terminates, the mechanism 22 (FIG. 1) continues to exert a positive force via the assembly 28 so that the anvil 29 actually pushes the collar 13 into the groove 33. Unlike prior art pulling heads, this collar insertion force is exerted through the same anvil 29 which transmitted the reaction force during bulb formation. The pulling head 20 is non-shifting. After the blind-bulb 18 has been formed and the locking collar set, continued pulling by the jaws assembly 27 causes the mandrel 11 to fracture at the break notch 49. The riveter 19 then is removed from the workpiece 17. The reciprocating mechanism 22 pushes the drawbolt 25 and collet 37 forward, permitting the jaws 35 to release the severed mandrel section 11b. The resilience of the member 32 returns the shroud 30 to its rest position (FIG. 3), ready for the next rivet installation.

Intending to claim all novel, useful and unobvious features shown or described, the inventor makes the following claims:

1. In a blind rivet of the type having a mandrel, and a sleeve and a locking collar both slidingly surrounding said mandrel, said mandrel having a circumferential locking groove to receive said locking collar upon installation of said rivet, said sleeve having a cylindrical body of uniform internal diameter and a head at one end facing said locking collar, said rivet being adapted for installation by a non-shifting pulling head, the improvement wherein the head of said sleeve is double counterbored to form adjacent inner and outer conical surfaces interior of said head, said outer conical surface extending inwardly from the exterior annular edge at which said counterbore intersects the exterior surface of said sleeve head to a smooth junction with said inner conical surface, said inner conical surface, extending inwardly from said junction to the inner annular edge at which said inner counterbore intersects the interior surface of said cylindrical body, said outer conical surface defining a relatively shallow locking collar entry resistance angle, the inner conical surface defining a relatively steeper angle for guiding insertion of said locking collar into the locking groove of said mandrel, said double counterbore being of continuously increasing diameter between said inner and said exterior annular edges.

2. A blind rivet according to claim 1 wherein said entry resistance angle is on the order of 45° with respect to the sleeve axis, and wherein said steeper angle is on the order of 20° with respect to said sleeve axis.

3. A blind rivet according to claim 1 wherein said locking groove has an inner surface that is generally parallel with the inner conical surface of said double counterbore to aid the swaging insertion of said collar into said locking groove, wherein said mandrel also includes a circumferential break notch rearward of said locking groove, and wherein the diameter of said mandrel between said locking groove and the mandrel break notch is slightly less than the diameter of said mandrel forward of said locking groove and rearward of said break notch.

4. A blind rivet according to claim 1 wherein said locking collar has a pair of outer annular edges that both are chamfered at the same angle as said entry resistance angle.

* * * * *